US007565436B2

(12) United States Patent  (10) Patent No.: US 7,565,436 B2
Rabie et al.  (45) Date of Patent: Jul. 21, 2009

(54) ETHERNET TO FRAME RELAY INTERWORKING WITH MULTIPLE QUALITY OF SERVICE LEVELS

(75) Inventors: Sameh Rabie, Kanata (CA); Richard Pommainville, Ottawa (CA); John Whatman, Ottawa (CA); Bashar Abdullah, Ottawa (CA); John Rosser Davies, Kanata (CA); Baghdad Barka, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 831 days.

(21) Appl. No.: 10/744,000

(22) Filed: Dec. 24, 2003

(65) Prior Publication Data

US 2005/0144327 A1    Jun. 30, 2005

(51) Int. Cl.
*G06F 15/16* (2006.01)
(52) U.S. Cl. .................. 709/229; 709/227; 709/228
(58) Field of Classification Search .......... 709/227–229
See application file for complete search history.

(56) References Cited

U.S. PATENT DOCUMENTS

| | | | |
|---|---|---|---|
| 6,104,700 A * | 8/2000 | Haddock et al. ............ 370/235 |
| 6,298,059 B1 * | 10/2001 | St-Amand et al. ........... 370/397 |
| 6,606,660 B1 * | 8/2003 | Bowman-Amuah ......... 709/227 |
| 6,640,249 B1 * | 10/2003 | Bowman-Amuah ......... 709/228 |
| 7,020,697 B1 * | 3/2006 | Goodman et al. ........... 709/223 |
| 2002/0131604 A1 * | 9/2002 | Amine ........................ 381/58 |
| 2002/0172158 A1 * | 11/2002 | Hoefelmeyer et al. ....... 370/241 |
| 2003/0048792 A1 * | 3/2003 | Xu et al. ..................... 370/400 |
| 2004/0078469 A1 * | 4/2004 | Ishwar et al. ................ 709/227 |
| 2004/0081093 A1 * | 4/2004 | Haddock et al. ............ 370/230 |
| 2004/0111461 A1 * | 6/2004 | Claudatos et al. ........... 709/200 |
| 2005/0013244 A1 * | 1/2005 | Parlos ........................ 370/229 |
| 2006/0013230 A1 * | 1/2006 | Bosloy et al. .......... 370/395.42 |

* cited by examiner

*Primary Examiner*—Nathan J Flynn
*Assistant Examiner*—Mohamed Wasel
(74) *Attorney, Agent, or Firm*—Anderson Gorecki & Manaras LLP

(57) ABSTRACT

A method of supporting multiple quality of service (QoS) levels for data being transmitted between two networking devices, such as customer equipment (CE), that use Ethernet and Frame Relay (FR). The method supports multiple QoS services in a network where a first CE is connected to a first edge device (interworking unit) using the Ethernet protocol and a second CE is connected to a second edge device using the FR protocol. The edge devices may be directly connected together or they may be connected through a network backbone using any generally accepted network protocol. The first CE may be connected to the first edge device using a single Ethernet port, multiple Ethernet ports, a single virtual local area network (VLAN), or multiple VLAN's. The second CE is connected to an edge device using a single data link connection (DLC), or multiple DLC's. The method ensures QoS for data transmitted between the first and the second CE via the Ethernet protocol to the FR protocol and vice versa.

31 Claims, 6 Drawing Sheets

ETHERNET TO FRAME RELAY INTERWORKING WITH MULTIPLE QUALITY OF SERVICE LEVELS

FIELD OF THE INVENTION

The present invention relates to methods of supporting multiple quality of service (QoS) levels for packets being transmitted over Ethernet and Frame Relay (FR) networks.

BACKGROUND OF THE INVENTION

Service providers are committed to providing the type of connectivity their customers require. As a result, the presence of Frame Relay (FR), Asynchronous Transfer Mode (ATM), or Point-to-Point (PPP) technologies on the customer side of the network is not uncommon. These feeds usually connect to a multi-service switch/router.

Ethernet is increasingly being used to interconnect customer equipment through provider networks. The high-speed uplink, however, is often ATM, Packet over Synchronous Optical Network (POS), or Gigabit Ethernet. This demand for various types of connectivity creates many challenges. A primary challenge is mapping the data correctly from one type of technology to another without traffic loss or data-integrity problems. Another challenge involves meeting service guarantees to the customer to meet the applications' requirements.

The legacy Ethernet Standard and devices support only a single QoS per interface. Similarly FR Standards do not support multiple QoS levels per connection.

The Institute of Electrical and Electronics Engineers (IEEE) Standard 802.1Q Ethernet Specification, however defines a tag, inserted into Ethernet frames, that defines virtual-LAN (VLAN) membership. Three bits in this tag identify user priority as defined by IEEE 802.1Q to provide for up to eight priority levels. Switches and routers can, therefore, use the tag to give traffic precedence by queuing outgoing frames in multiple buffers.

Similarly, Diff-Serv is an Internet Engineering Task Force (IETF) specification that works at the network layer by altering the Internet protocol (IP) type-of-service field to identify particular classes of service, The Internet Engineering Task Force (IETF) is a large open international community of network designers, operators, vendors, and researchers concerned with the evolution of the Internet architecture and the smooth operation of the Internet. Diff-Serv could be used for signaling the class of service per Ethernet frame when the Upper Layer Protocol (ULP) is IP. Diff-Serv, however, is simply a class-of-service management scheme rather than a complete QoS mechanism.

Other internetworking protocols available for supporting QoS include: Resource Reservation Protocol Traffic Engineering (RSVP-TE), used to reserve end-to-end network resources for a particular network flow (in one direction); Real-Time Transport Protocol, which is optimized to deliver real-time data such as audio and video streams through multiplexed User Datagram Protocol (UDP) links; IP Multicast; and Multi-protocol Label Switching (MPLS).

The Metro Ethernet Forum (MEF) stipulates the use of the IEEE 802.1Q tag and/or the layer 3 (L3), and higher layer, fields in the packet header to support multiple QoS on an Ethernet interface. The most common application among networking providers is when L3 traffic is IP with Diff-Serv.

Frame relay networks are connection-oriented and can support QoS using two mechanisms. The first relates to bandwidth guarantee through a preset Committed Information Rate (CIR) and Excess Information Rate (EIR) that allow packets to be designated as either "committed" or "excess". Unlike CIR packets that are guaranteed low loss rate, EIR packets receive low or no bandwidth guarantee. The other mechanism assigns a QoS class or transfer/emission priority to the FR connection. Note that unlike an Ethernet VLAN that can support multiple QoS using the p-bits, a Standard FR connection can only support a single QoS.

Frame Relay (FR) traffic management involves a discard eligibility (DE) bit that is available in the Q922 header to indicate the discard priority of a frame. A frame with DE=1 will be discarded first upon congestion. FR standards allow for the specification of 16 transfer priorities (TP) and 8 discard priorities (DP). Transfer and discard priorities are applicable to all frames that belong to a particular FR Data Link Connection (DLC). The DLC transfer and discard priorities are defined by ITU X.36 where 16 TP levels are specified. TP is defined per DLC and for each direction. During data transfer a DLC with a high TP will have its frames serviced before frames of a DLC with a lower TP. Eight DP levels are specified. DP is defined per DLC and for each direction. Upon network congestion, frames with a lower DP level will be discarded in preference to frames with a higher DP level. Frame TP and frame DP are set at subscription time or by signaling or configuration. FR standards also specify an alternate method for QoS signaling/configuration per DLC and support of four services (ITU-T X.146) differentiated by frame loss and frame delay expectations.

When choosing a frame relay service, customers typically assign voice/video traffic to a low delay connection, and allocate sufficient CIR bandwidth to minimize packet discards. Data connections are typically assigned to lower QoS classes/priorities, depending on the applications' needs. The range of QoS parameters are specified in the Frame Relay Forum's FRF.13 Service Level Definition. This specifies the service level agreements and details how delay, frame delivery, data delivery, and service availability are calculated.

SUMMARY OF THE INVENTION

The present invention describes methods and systems for Ethernet to Frame Relay Interworking with Multiple Quality of Service Levels.

In accordance with a broad aspect of the invention there is provided a method for enabling multiple QoS support of Frame Relay (FR) and Ethernet networks comprising: identifying a packet according to a first network protocol for servicing; determining a QoS metric for the identified packet; and based upon the determine QoS metric, servicing the identified packet for transmission in accordance with a second network protocol.

In accordance with another broad aspect of the invention there is provided a system for enabling multiple QoS support over FR and Ethernet networks comprising: an input; and control circuitry associated with the input and adapted to: identify a packet according to a first network protocol for servicing; determine a QoS metric for the identified packet; and based upon the determined QoS metric, service the identified packet for transmission in accordance with a second network protocol.

In accordance with one embodiment of the invention the system referred to above is located at an edge of a core network. In accordance with another embodiment of the invention the system referred to above is located in a user element.

In accordance with a broad embodiment of the invention there is provided an Interworking Unit (IWU) interfaced between an Ethernet and FR network. Based upon this Ethernet-IWU-FR configuration, several combinations are presented within the same general scope of the present invention. According to particular embodiments of the invention there are provided several methods for supporting multiple QoS levels between Ethernet-based and FR-based customer equipment (CE).

Embodiments of the invention provide methods for supporting multiple QoS services in a network where a first CE is connected to a first IWU using the Ethernet protocol and a second CE is connected to a second IWU using the FR protocol. The IWUs may be directly connected together or connected through a network backbone using any number of network protocols. The first CE may be connected to the first IWU using a single Ethernet port, multiple Ethernet ports, a single virtual local area network (VLAN), or multiple VLAN's. The Ethernet port may be legacy/untagged where all incoming traffic would receive the same QoS treatment, or tagged supporting the IEEE 802.1Q Standard. Tagged interfaces may use the VLAN ID and/or the p-bits for indicating implicitly or explicitly the QoS of the frame. The second CE may be connected to an edge device using a single data link connection (DLC), or multiple DLCs. The CE's may also be bridged at layer 2 or routed at layer 3 IP. The IWUs enable multiple QoS support on the network access link in the egress direction (network edge to CE direction).

The present inventions support multiple QoS, while maintaining operations simplicity, bandwidth sharing, segregation among traffic classes, scalability, and support of tagged and untagged interfaces.

The present invention may further enable ordered delivery of frames between CE devices by ensuring that traffic classified with the same QoS is delivered to the terminating CE device in the order that it was transmitted from the originating CE device.

DETAILED DESCRIPTION OF THE PREFERRED EMBODIMENTS

The invention will be described for purposes of illustration only in connection with certain embodiments. However, it is to be understood that other objects and advantages of the present invention will be made apparent by the following description of the drawings according to the present invention. While preferred embodiments are disclosed, this is not intended to be limiting. Rather, the general principles set forth herein are considered to be merely illustrative of the scope of the present invention and it is to be further understood that numerous changes may be made without straying from the scope of the present invention.

Figure 1A:
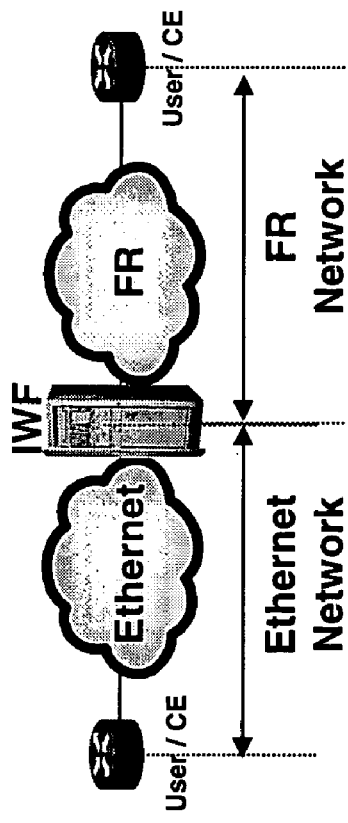
FIGS. 1A and 1B are schematics diagrams of the present invention in accordance with broad embodiments thereof.

FIG. 1A is a schematic of an Ethernet/FR communications system according to an embodiment of the invention. Specifically, there is shown a gateway solution having a direct interworking unit (IWU), disposed between an Ethernet and FR network.

Figure 1B:
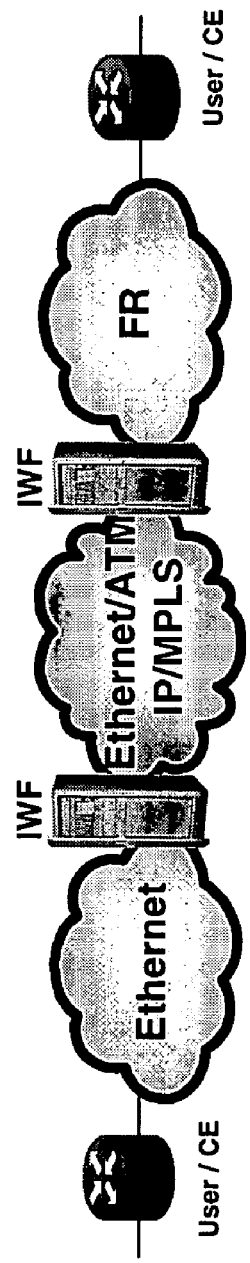

Similarly FIG. 1B presents a schematic of an Ethernet/FR communication system according to another broad embodiment of the invention wherein IWUs are disposed on either edges of a core network, which core network may include Ethernet, ATM, IP, MPLS or any other such core network as is well known in the art.

While the following description focuses on the access QoS between the customer equipment (CEs) and their respective networks, as congestion often occurs here due to the relatively narrow bandwidth 'pinch-point' in the first/last mile, one skilled in the art will appreciate that the following techniques can be equally extended to the core network. Similarly, one skilled in the art will appreciate that, although, the following description refers to processing which occurs in an IWU, said processing could occur in the CE, which may include customer-located equipment as in carrier-managed services, internal networking devices such as voice or wireless servers/gateways, or external interworking devices for connecting different networks/service providers.

One of skill in the art will also appreciate that while separate FR and Ethernet IWUs are described in the following examples, one could utilize a single IWU by extending the attachment circuit (AC) (Ethernet or FR) to the other network edge.

To enable multiple QoS support for packets traversing Ethernet and FR networks, the respective IWUs perform different functions as FR and Ethernet networks have different roles and QoS capabilities. For example, in practice a FR DLC may carry multiple VLANs, but the reverse is less likely. Conversely, a tagged Ethernet frame can carry QoS indications (p-bits), but typically not a FR frame that can only carry discard priority information.

As will be apparent to one skilled in the art, enabling multiple QoS support in accordance with the techniques described below may incorporate several additional techniques known in the art such as queuing, scheduling, policing, shaping, routing, admission control, and congestion control. An example of a scheduling technique is egress link scheduling. In accordance with an embodiment of the present invention each service/traffic class is serviced in its own class queue by a class-based scheduler. Such scheduler would normally favor the premium classes over the lower-priority classes. Within each class queue, each packet can be assigned a different drop precedence where higher drop precedence packets are discarded before lower-precedence ones under congestion.

Generally speaking, the IWU to FR side QoS may be determined based on the Ethernet port information, VLAN, p-bits, VLAN and p-bits, or upper layer protocol information (L3-L7) including Differentiated Services Code Point (DSCP) information, IP, IPX, SNA, TPC, UDP, and application information:

A) Using Ethernet information—This is the typical case, when either the QoS information is carried within the frame or configured per Ethernet port. For example, the QoS may be determined based on port/p-bits, port/VLAN, or port/VLAN/p-bits. MAC addresses may also be used, which can play a similar role to VLANs in identifying connections/QoS; or B) Using ULP information—For example DSCP or L3-L7 information including, protocol types, IP source/destination addresses, TCP/UDP port numbers and application types.

The packet is then serviced for transmission on the IWU to FR side, thereby enabling multiple QoS support, using one of the following techniques:

A) Using multiple DLCs with one DLC per QoS. In this instance a packet may be mapped to one of the DLC's and scheduled according to a connection scheduling scheme to deliver the QoS differentiation among the DLCs. As will be apparent to one skilled in the art two or more QoS levels could be combined in one DLC for economy;

B) Using a single DLC. In this scenario, the packet may be mapped to a single DLC, and then scheduled for transmission according to a sub-connection scheduler that can schedule multiple queues within a single DLC.

In the IWU to FR scenario, the FR interface can support a combination of legacy FR Data Link Connections (DLCs) Ethernet-Aware DLCs, and IP-Aware DLCs simultaneously. The use of a FR DLC for carrying multiple QoS frames provides a scalable solution.

For purposes of the foregoing general examples, the various scheduling schemes described above refer to discrete levels of a hierarchical scheduling scheme, which may include the following levels:

a. A Class Scheduler, for allocating link bandwidth among the various standard FR services. Typically, a class-based scheduler is used for favoring the important classes.

b. A Connection Scheduler, for managing bandwidth among the various FR DLCs. Typically, a Weighted Fair Queuing (WFQ) or class-based queuing scheduler is used for this purpose. Some of these connections may be legacy L2 FR, while others may be Ethernet (or IP)-aware with multiple QoS.

c. Sub-connection Scheduler—These later DLCs will use another class-based scheduling level for allocating the DLC bandwidth among its various traffic classes based on the p-bits (or IP DSCP).

Similarly, the IWU to Ethernet side QoS is determined based on either the Ethernet/Upper layer Protocol (ULP) info as described above with respect to the IWU to FR side determination, or FR information:

A) Using FR information—For example, the Data Link Connection Identifier (DLCI), when multiple DLCs are used, or the frame Discard Eligibility (DE) bit indication. This option may be used if the native service is not Ethernet (for example when interworking PPP/FR to PPP/Ethernet, or when the Ethernet frames do not carry QoS indications.

The packet is then serviced for transmission on the IWU to Ethernet side, thereby enabling multiple QoS support, using one of the following techniques:

A) Using multiple Ethernet ports. In this instance a packet may be mapped to one of the Ethernet ports that supports its QoS. The port need not implement a sophisticated scheduler when a single QoS is supported per port (i.e. only a basic scheduler would be required). As will be apparent to one skilled in the art, two or more classes may be mapped to a single port for economy.

B) Using a single Ethernet port that supports multiple QoS. In this instance a packet may be mapped onto a single Ethernet port that implements one of various scheduling techniques for supporting multiple QoS. Such techniques include class-based queuing, weighted fair queuing, or hierarchical scheduling (for example the first level selects the overall service category, the second level selects the VLAN, and the third level schedules the queue based on the VLAN p-bits).

The QoS techniques described above for both the IWU to FR and IWU to Ethernet directions may be combined in various ways, and used in various network and service interworking scenarios. FIGS. 2-5 illustrate three such examples.

Figure 2:
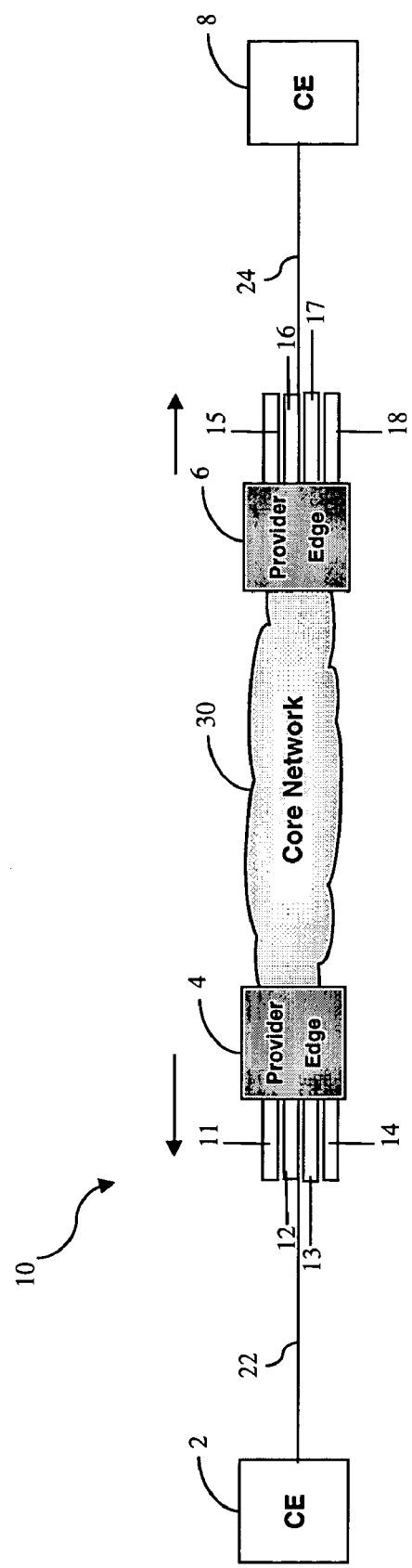
FIG. 2 is a schematic of a communication system according to a first embodiment of the invention.

FIG. 2 illustrates a schematic of an Ethernet/FR communication system according to an embodiment of the present invention. The communication system 10 includes a first IWU 4, which includes four class queues 11, 12, 13, 14, which queues are in turn connected to a first access link 22. The first access link 22 is connected to a first customer equipment (CE) 2 using either an Ethernet port connection or an Ethernet VLAN connection. The communication system 10 further includes a second IWU 6, which includes four class queues 15, 16, 17, 18, which are each connected to a second access link 24. It should be understood that any number of class queues may be present and that the choice of 4 class queues is merely for purposes of illustration. Typically said class queues fall within the range of anywhere from 2 to 8. The second access link 24 is connected to a second CE 8 using a single FR data link connection. The IWUs 4 and 6 are connected together over a network link through a network core 30. While the term "network link" is used herein, it should be understood that such network link is not limited to merely a trunk between the two IWU, but may include IWUs that are connected over some logical or physical connections spanning multiple networking nodes.

According to this embodiment of the invention, data packets may be transmitted from the first CE 2 to the second CE 8 or vice versa. As will be apparent to one skilled in the art, a data packet may include both variable size and fixed size frames, and may carry any type of information including computer communications traffic, voice or video.

The first CE 2 transmits Ethernet data packets to the IWU 4 over the first access link using the Ethernet protocol. The IWU 4 then forwards the data packets to the second IWU 6, which converts the Ethernet data packets to FR data packets. The second edge device 6 then transmits the FR data packets to the second CE 8.

It should be noted that the Ethernet data packets transmitted by the first CE 2 may be converted to FR data packets at the first IWU 4, and then forwarded to the second IWU 6 using the FR protocol, which in turn transmits the data packets to their destination, the CE 8. Alternatively, the Ethernet data packets transmitted by the first CE 2 may be forwarded through the core network using the Ethernet protocol, and then converted to FR data packets at the second IWU 6. It should be further noted that the forwarding of data packets between the two IWUs 4 and 6 may be done using any other network protocol (including ATM or MPLS) provided the packets are ultimately translated into either the Ethernet or FR at the ingress side of the IWUs 4 or 6 depending on which edge device is interworking between the two protocols.

To enable a desired QoS level for each data packet transmitted between CE 2 and CE 8, the data packets can be classified with a QoS level based on the delay, delay variation, and bandwidth they require for transmission. To enable end-to-end QoS for data transmitted between CE 2 and CE 8, the first and second CE devices, the IWUs, and the core network, preferably provide preferential treatment for the higher-priority classes over the lower-priority ones.

Multiple applications can travel between the same CE devices, and each application may require different QoS (i.e., differing loss, delay, jitter requirements) and be subject to a differing service level agreement (SLA). Accordingly, the growing interest in Ethernet-FR service interworking supports categories such as Premium, Platinum, Gold, Silver, and Bronze applications or any similar delineation of categories. Such applications can be classified by TABLE 1 shown below.

TABLE 1

| Traffic Category | Application Example | Service Name |
| --- | --- | --- |
| Network Control | Alarms and heartbeats | Platinum |
| | Routing table updates | Platinum |
| Interactive | IP Telephony | Platinum |
| | Inter-Human Communications Video | Platinum |
| Responsive | Inter-Human Communications Streaming audio/video | Gold |
| | Human-Host Communications eBusiness (B2B, B2C) | Silver |
| Timely | Transaction Processing Email | Bronze |
| | Store and Forward FTP | Bronze |
| Background | Best Effort Pointcast | Bronze |
| | Background/Standby | |

For purposes of illustration, the QoS levels are divided into four levels, each representing a different level of service and are named platinum, gold, silver, and bronze but they may vary in the number, naming, and service characteristics. Data packets that require low loss, low jitter, and low delay are designated as a platinum service. These are data packets that typically require absolute priority and hence are supported by a single guaranteed bit rate. A second level of service is known as gold that specifies a minimum bandwidth guarantee and an upper delay bound, and is supported by two rates for guaranteed and excess traffic. A third level is known as silver is used for transmitting packets that require a minimum bandwidth guarantee but no delay bounds. A fourth level is designated as bronze and is used for best effort service for which the loss, delay, and jitter are typically not specified.

Again, referring to FIG. 2, data packets transmitted by the first CE 2 are received by the first IWU 4. These packets are routed over the network to the second IWU 6. The second IWU 6 reads the header portion of each Ethernet frame, which includes the source address, the destination address and an IEEE 802.1Q tag. The 802.1Q tag may include a VLAN-ID and a three-bit priority indication, commonly known as the p-bits. The p-bits can encode a combination of class of service and drop precedence. Accordingly the IWU 6 is operate to, among other things, perform the following functions:

- using the p-bits, VLAN ID, or both VLAN and p-bits carrying the QoS information to select the class of service queue to which the data packet is forwarded;
- using the p-bits carrying the drop precedence information to assign a drop precedence to each packet within each class queue;
- using a weighted fair queue (or a class-based queuing) scheduler to send data packets from the class of service queues on the access link to CE 26 in the order determined by the class of service precedence rules;
- dropping data packets according to the drop precedence in each class of service queue when the access link is congested;
- transmitting the QoS of the data packet over a single FR DLC For purposes of this specification, the foregoing technique is known as Ethernet-aware FR.

Figure 3:
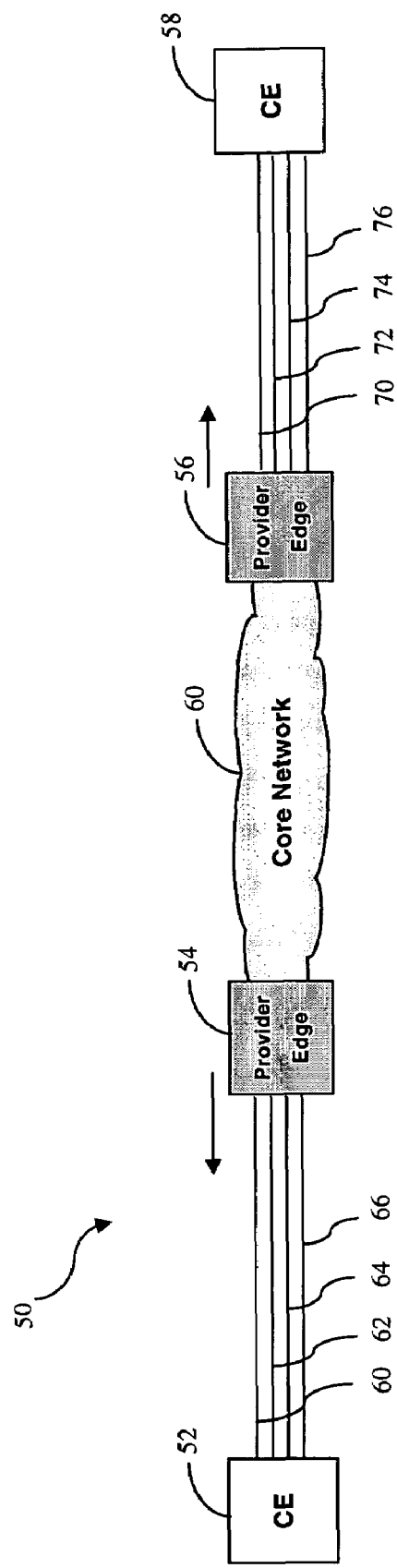
FIG. 3 is a schematic of a communication system according to a second embodiment of the invention.

In the reverse direction, the data packets are received by the second IWU 6 from CE 8, which transmits them over the network to the first IWU 4. The IWU 4 reads the header portion of each Ethernet frame (it is assumed for example that the native service between the CEs is Ethernet), which includes the source address, the destination address, and the mapping of part of the IEEE 802.1Q tag, namely the VLAN-ID and/or the p-bits. The p-bits encode a combination of class of service and drop precedence. The IWU 4 performs the following functions:

- uses the p-bits, VLAN-ID, or both VLAN and p-bits carrying the QoS information to select the class of service queue to which the data packet is forwarded;
- uses the p-bits carrying the drop precedence information and/or the FR DE bit to assign a drop precedence to each packet within each class queue
- uses a weighted fair queue scheduler (or a class-based queuing scheduler) to send data packets from the class of service queues on the access link to CE 2 in the order determined by the class of service precedence rules;
- drops data packets according to the drop precedence in each class of service queue when the access link is congested;
- transmits the data packet over the Ethernet interface FIG. 3 illustrates a schematic of an Ethernet/FR communication system 50 according to a second embodiment of the present invention. The communication system 50 includes a first CE 52 connected to first IWU 54 with multiple Ethernet port connections (60, 62, 64, 66). The communication system 50 further includes a second CE 58 connected to a second IWU 56 with multiple data link connections (70, 72, 74, 76). The IWUs 54, 56 are also connected together over a network link (not shown) through a core network 61.

In this embodiment of the invention, the data packets transmitted across the network from the first CE 52 to the second CE 58 are each classified with a QoS level as described above. Ethernet data packets are transmitted from the first CE 52 to the first IWU 54 over the multiple Ethernet port connections, with each port connection transmitting data packets designated with a specific QoS level. For example, the Ethernet port 60 may be used to transmit platinum level data packets, the Ethernet port 62 may be used to transmit gold level data packets, the Ethernet port 64 may be used to transmit silver level data packets and the Ethernet port 66 may be used to transmit bronze level. The data packets received by the first IWU 54 are routed over the core network 61 to the second IWU 56.

In FIG. 3, the second IWU 56 is connected to the second CE 58 with multiple DLC's 70, 72, 74, 76. Each DLC, 70, 72, 74, 76, carries data traffic corresponding to a particular QoS. For example, DLC 70 may be used to carry voice traffic, DLC 72 may be used to carry streaming video traffic, DLC 74 may be used to carry transactions traffic, and DLC 76 may be used to carry best effort traffic.

The Ethernet data packets received at the second IWU 56 are each mapped to a FR DLC based on the port number from which the data packet was transmitted. For example, if a data packet is received from Ethernet port 60, then the data packet is mapped to the FR DLC 70. If a data packet is received from Ethernet port 62, then the data packet is mapped to FR DLC 72. If a data packet is received from Ethernet port 64, then the data packet is mapped to FR DLC 74. If a data packet is received from Ethernet port 66, then the data packet is mapped to FR DLC 76. Once the data packets have been mapped to the appropriate FR DLC, a scheduler schedules the transmission of the data packets to the CE 58.

It should be noted that in a further embodiment of the invention, the CE 52 may be connected to the first IWU 54 using multiple VLAN's. In this embodiment, the second CE 56 reads the header portion of the Ethernet data packet, which includes the source address, the destination address and an IEEE 802.1Q tag. The IEEE 802.1Q tag includes a 12-bit tag, which identifies the VLAN that transmitted the data packet. Based on this VLAN ID, the data packet is mapped to a queue for an FR DLC that carries data of a particular class of service that corresponds to the class of service of the VLAN that transmitted the data packet. For example, if the VLAN ID was associated with platinum service data packets, the data packet may be mapped to an FR DLC with a high QoS.

In FIG. 3, FR data packets may also be transmitted from the second CE 58 to the first CE 52. Each DLC is designated a FR QoS level. For example, the FR data packets are received by the first IWU 54 and mapped to a queue that is connected to a particular Ethernet port or queue, depending from which DLC the data packet was received. For example, if the DLC is configured as a high QoS DLC, then the FR data packet is mapped to a platinum class service port or queue.

Figure 4:
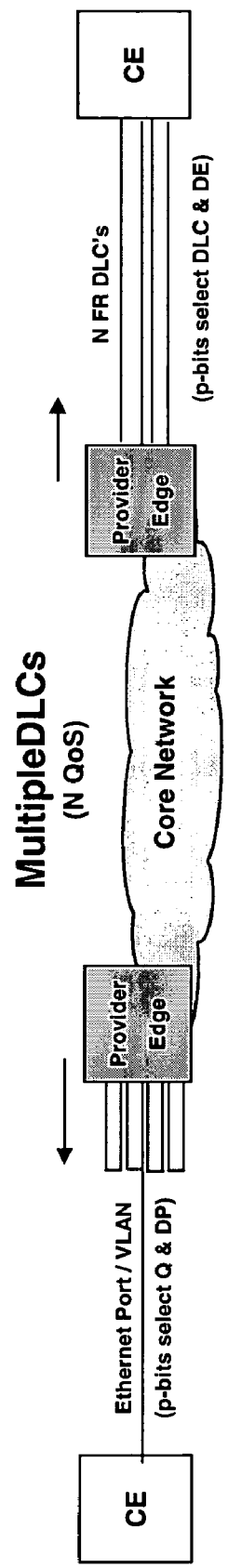
FIG. 4 is a schematic of a communication system according to a third embodiment of the invention.
Figure 5:
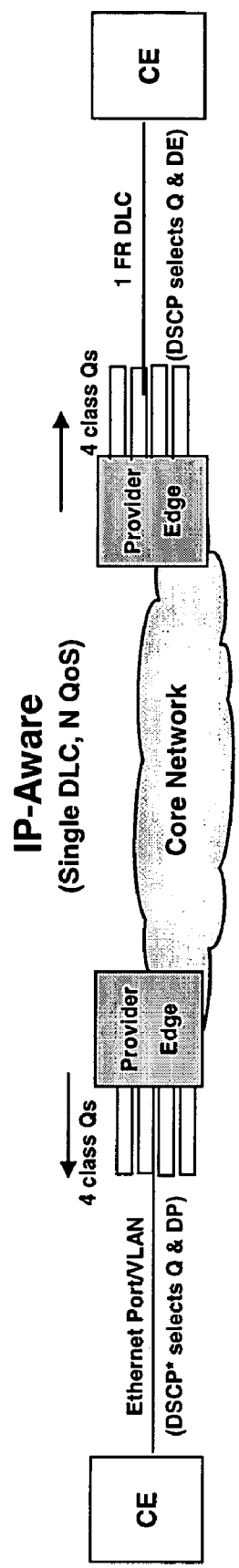
FIG. 5 is a schematic of a communication system according to a fourth embodiment of the invention.

FIGS. 4 and 5 illustrate variations of the embodiments described above. Such variations may exist depending upon the given application requirements and desired QoS levels.

In particular, FIG. 4 is a schematic of a third embodiment of the present invention including a single Ethernet interface and multiple FR DLCs where multiple QoS levels are provided. In such an embodiment, the FR side uses one DLC for each QoS and the Ethernet side uses one interface (in VLAN-unaware mode) or one VLAN for all QoS levels. The p-bits are used for determining QoS. This configuration results in segregation of each QoS stream on the FR side for interoperability with legacy FR equipment, while using a single port or VLAN on the Ethernet side for efficiency and scalability.

FIG. 5 is a schematic of a fourth embodiment of the present invention including a single Ethernet interface (or VLAN) and a single FR DLC where multiple QoS levels are provided. In such an embodiment, one DLC with Diff-Serv DSCP (or any other L3-L7 protocol, which may also include policy attributes, e.g., subscriber-ID) selects QoS on the FR side while one Ethernet interface or one VLAN with Diff-Serv DSCP (or any other L3-L7 protocol together with policy attributes) selects QoS on the Ethernet side. This configuration results in operational simplicity, scalability, and dynamic bandwidth sharing and can work with either Ethernet interfaces operating in VLAN-unaware or VLAN-aware mode. However, this configuration is not a pure L2 service, but depends on L3 or higher layer protocol and may not be suitable for non-IP traffic thereby requiring modern IP-Aware Ethernet and FR switches. The FIG. 5 configuration is similar to that of FIG. 2, except that Upper Layer Protocol (ULP) information (such as IP DiffServ, IP addresses, protocol type, TCP/UDP port numbers, and application layer information) are used individually or in combination instead of the Ethernet information for determining the service flows and their QoS. In this scenario, DSCP information may be used for assigning a packet drop precedence in either of the interworking directions. It should be noted that the IP-Aware term assumes that the layer 3 protocol is IP.

Figure 6:
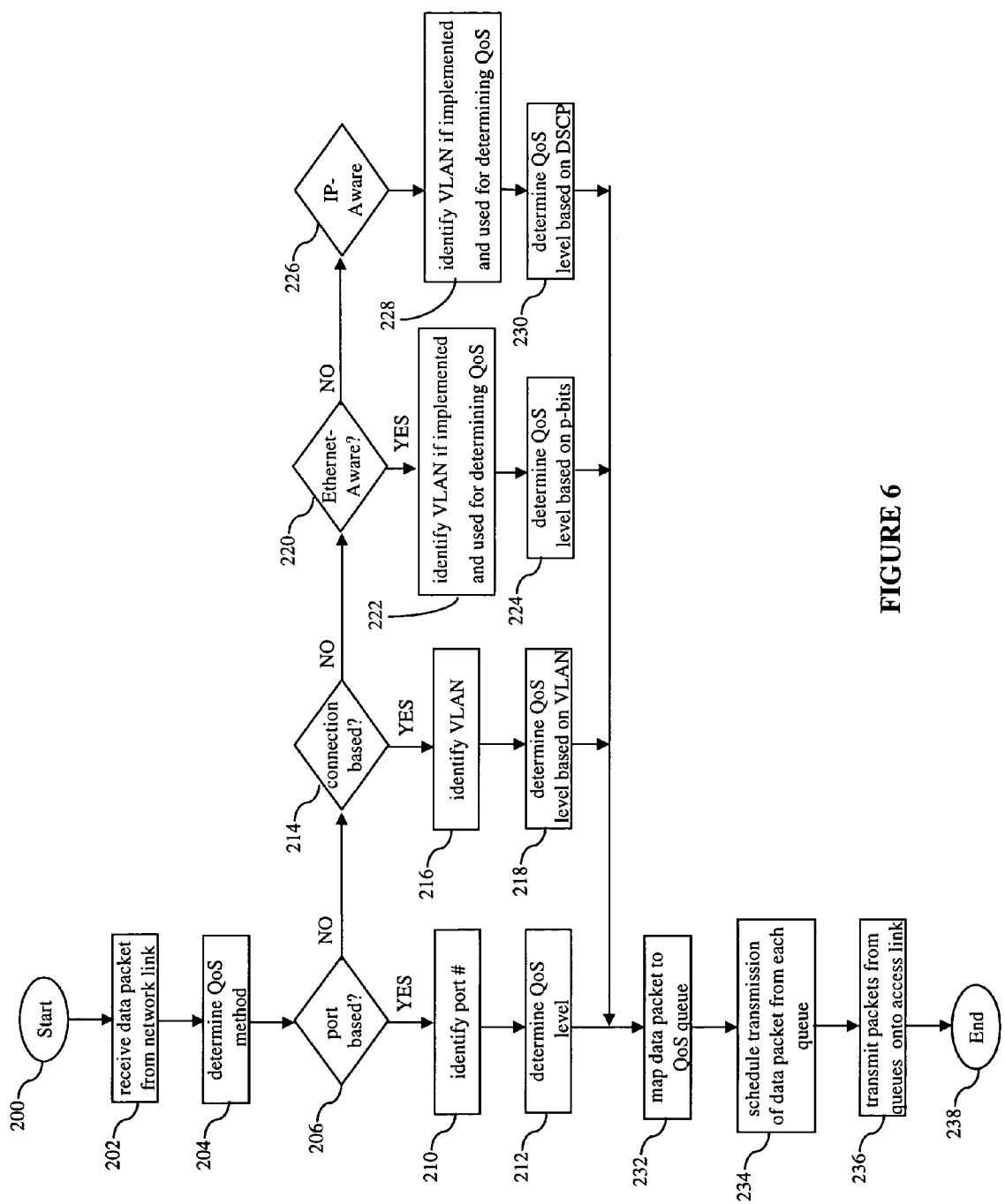
FIG. 6 is a flow diagram according to embodiments of the present invention.

FIG. 6 shows a flowchart that details a process executed by IWU 6 to support multiple QoS for data packets transmitted from an IWU 6 to customer equipment CE as described in FIGS. 2-5. The process begins at step 200. In the next step 202, IWU 6 receives a data packet from a network link. The process proceeds to step 204 where the QoS method is determined based on the network QoS option to be used. Alternatively, it should of course be understood that the QoS determination method determination may not be a required if only one QoS method is used. Decisions 206, 214, 220, and 226 are used to respectively decide whether the QoS method used is port based, connection based, Ethernet-Aware, or IP-Aware.

If the QoS method determined is "port based", then the process proceeds to step 210. In step 210, the process identifies the port identifier from which the data packet was received. The process then proceeds to step 212, where it determines the QoS level of the data packet based on the port identifier the data was transmitted by the CE 2. Once the QoS level is determined in step 212, the process proceeds to step 232 described below.

If the QoS service method determined is "connection based", then the process proceeds to step 216. In step 216, the process identifies the VLAN that the CE 2 transmitted the data packet to the IWU 6. The process then proceeds to step 218, where it determines the QoS level of the data packet based on the VLAN identifier determined in step 216. Once the QoS level is determined in step 218, the process proceeds to step 232 described below.

If the QoS service method determined is "Ethernet-Aware", then the process proceeds to step 222. In step 222, the process may identify the VLAN the CE 2 transmitted in the data packet to the IWU 6. The process then proceeds to step 224, where it determines the QoS level of the data packet based on the VLAN identifier (if applicable) determined in step 222 and the p-bits of the Ethernet header. Note that the QoS of VLAN-aware Ethernet IWUs can be determined based on a combination of VLAN and p-bits, or p-bits only, depending on whether VLAN identifiers are used for QoS.

Once the QoS level is determined in step 224, the process proceeds to step 232 described below.

If the QoS service method determined is "IP-Aware", then the process proceeds to step 228. In step 228 it may identify the VLAN the CE 2 transmitted the data packet from. The process then proceeds to step 230, where it determines the QoS level of the data packet based on the VLAN identifier (if applicable) determined in step 228 and the DSCP bits of the IP header in the Ethernet frame. Once the QoS level is determined in step 230, the process proceeds to step 232 as described below. Note again, QoS of VLAN-aware Ethernet IWUs can be determined based on a combination of VLAN and DSCP, or DSCP information only, depending on whether VLAN identifiers are used for connection identification.

Upon determining whether the QoS method is port-based, connection-based, Ethernet-aware, or IP-Aware, along with determining the related parameters, the method continues with step 232. In step 232, the process maps the data packet to a FR DLC and corresponding service queue that corresponds to the QoS level previously determined. The process then proceeds to step 234 where the transmission of the data packets stored in the service queues are scheduled. The process then proceeds to step 236, where data packets from the service queues are transmitted onto the access link. The process ends at step 238.

As will be apparent to one skilled in the art the process set out in FIG. 6 could be modified to for purposes of processes executed by the IWU 4 for transmitting frames in the IWU-to-CE2 direction by taking into consideration FR DLC information at the identifying stage and then mapping the data packet to a corresponding service queue on the Ethernet interface.

As will be further apparent to one of skill in the art, the techniques described above can be implemented in digital electronic circuitry, in computer hardware, firmware, software, or in combinations thereof.

It should be understood that the preferred embodiments mentioned here are merely illustrative of the present invention. Numerous variations in design and use of the present invention may be contemplated in view of the following claims without straying from the intended scope and field of the invention herein disclosed.

Having thus described the invention, what is claimed as new and secured by Letters Patent is:

1. A method of implementing Quality of Service (QoS) across Frame Relay and Ethernet networks to enable similar QoS to be provided to packets in both the Frame Relay and Ethernet networks as the packets pass from one network to the other, the method comprising the steps of:
   receiving a packet from the Ethernet network;
   identifying the packet according to an Ethernet protocol for servicing;
   determining an Ethernet QoS metric for the identified packet, the QoS metric being associated with the packet on the Ethernet network, said determining an Ethernet QoS metric includes considering Ethernet information, wherein said Ethernet information includes p-bits information; and
   based upon the determined Ethernet QoS metric, determining a corresponding Frame Relay QoS metric; and
   servicing the identified packet for transmission on the Frame Relay network in accordance with the determined corresponding Frame Relay QoS metric protocol to thereby enable similar QoS to be provided to the packet in the Frame Relay network as was provided to the packet in the Ethernet network, wherein said servicing the identified racket further includes assigning a drop precedence to the packet based on the p-bits information.

2. The method of claim 1, wherein the Ethernet information includes Ethernet port information.

3. The method of claim 1, wherein the Ethernet information includes virtual local area network identifier (VLAN ID) information.

4. The method of claim 3, wherein the Ethernet information further includes VLAN ID information.

5. The method of claim 1, wherein the step of determining a QoS metric includes considering Upper Layer Protocol (ULP) information.

6. The method of claim 5, wherein the ULP information includes Internet Protocol (IP) packet information.

7. The method of claim 6, wherein the IP packet information includes Differentiated Services Code Point (DSCP) bit information.

8. The method of claim 7, wherein the IP packet information further includes VLAN ID information.

9. The method of claim 7, wherein the step of servicing further includes assigning a drop precedence to the packet based on the DSCP bit information.

10. The method of claim 1, wherein the step of servicing includes mapping the packet to a Frame Relay Data Link Connections (DLC) and scheduling the packet for transmission according to a sub-connection scheduling scheme.

11. The method of claim 1, wherein the step of servicing includes mapping the packet to one of a plurality of Frame Relay Data Link Connections (DLCs) and scheduling the packet for transmission according to a connection scheduling scheme.

12. A method of implementing Quality of Service (QoS) across Frame Relay and Ethernet networks to enable similar QoS to be provided to packets in both the Frame Relay and Ethernet networks as the packets pass from one network to the other, the method comprising the steps of:
   receiving a packet from the Frame Relay network;
   identifying the packet according to a Frame Relay protocol for servicing;
   determining a Frame Relay QoS metric for the identified packet, the QoS metric being associated with handling of the packet on the Frame Relay network by considering FR information; and
   based upon the determined Frame Relay QoS metric, determining a corresponding Ethernet QoS metric; and
   servicing the identified packet for transmission in accordance with an Ethernet protocol to thereby enable similar QoS to be provided to the packet in the Ethernet network as was provided to the packet in the Frame Relay network, wherein said servicing the identified racket further includes assigning a drop precedence to the packet based on discard eligible (DE) bit information.

13. The method of claim 12, wherein the Frame Relay information includes data link connection information.

14. The method of claim 12, wherein the step of servicing includes mapping the packet to an Ethernet port and scheduling the packet for transmission according to a class scheduling scheme.

15. The method of claim 12, wherein the step of servicing includes mapping the packet to one of a plurality of Ethernet ports and scheduling the packet for transmission according to a basic scheduling scheme.

16. A system for implementing Quality of Service (QoS) across Frame Relay and Ethernet networks to enable similar QoS to be provided to packets in both the Frame Relay and Ethernet networks as the packets pass from one network to the other comprising:
   an input; and
   control circuitry associated with the input and adapted to:
   receive a packet from the Ethernet network;
   identify a the packet according to an Ethernet protocol for servicing;
   determine an Ethernet QoS metric for the identified packet, the QoS metric being associated with the packet on the Ethernet network, said determining an Ethernet QoS metric includes considering Ethernet information, wherein said Ethernet information includes p-bits information; and
   based upon the determined Ethernet QoS metric, determining a corresponding Frame Relay QoS metric; and
   service the identified packet for transmission on the Frame Relay network in accordance with the determined corresponding Frame Relay QoS metric protocol to thereby enable similar QoS to be provided to the packet in the Frame Relay network as was provided to the packet in the Ethernet network, wherein said servicing the identified racket further includes assigning a drop precedence to the packet based on the p-bits information.

17. The system of claim 16, wherein the Ethernet information further includes Ethernet port number information.

18. The system of claim 17, wherein the Ethernet information further includes VLAN ID information.

19. The system of claim 16, wherein the control circuitry is further adapted to consider Upper Layer Protocol (ULP) information to determine a QoS metric.

20. The system of claim 19, wherein the ULP information includes Internet Protocol (IP) information.

21. The system of claim 20, wherein the IP information includes Diff-Serv Differentiated Services Code Point (DSCP) bit information.

22. The system of claim 21, wherein IP information further includes virtual local network identifier (VLAN ID) information.

23. The system of claim 22, wherein the control circuitry is further adapted to assign a drop precedence to the packet based on the DSCP bit information.

24. The system of claim 16, wherein the control circuitry is further adapted to map the packet to a Frame Relay Data Link Connections (DLC) and schedule the packet for transmission according to a sub-connection scheduling scheme to service the packet.

25. The system of claim 16, wherein the control circuitry is further adapted to map the packet to one of a plurality of Frame Relay Data Link Connections (DLCs) and schedule the packet for transmission according to a connection scheduling scheme to service the packet.

26. The system of claim 16, wherein the system is located at an edge of a core network.

27. The system of claim 16, wherein the system is located in a user element.

28. A system of implementing Quality of Service (QoS) across Frame Relay and Ethernet networks to enable similar QoS to be provided to packets in both the Frame Relay and Ethernet networks as the packets pass from one network to the other comprising: an input; and control circuitry associated with the input and adapted to:
   receiving a packet from the Frame Relay network;
   identify the packet according to a Frame Relay protocol for servicing;
   consider Frame Relay information to determine a Frame Relay QoS metric for the identified packet, the QoS metric being associated with handling of the packet on the Frame Relay network; and
   based upon the determined Frame Relay QoS metric, determining a corresponding Ethernet QoS metric; and
   service the identified packet for transmission in accordance with an Ethernet protocol to thereby enable similar QoS to be provided to the packet in the Ethernet network as was provided to the packet in the Frame Relay network, wherein said servicing the identified racket further includes assigning a drop precedence to the packet based on discard eligible (DE) bit information.

29. The system of claim 28, wherein Frame Relay information includes data link connection information.

30. The system of claim 28, wherein the control circuitry is further adapted to map the packet to an Ethernet port and schedule the packet for transmission according to a class scheduling scheme to service the packet.

31. The system of claim 28, wherein the control circuitry is further adapted to map the packet to one of a plurality of Ethernet ports and schedule the packet for transmission according to a basic scheduling scheme to service the packet.

* * * * *

UNITED STATES PATENT AND TRADEMARK OFFICE
CERTIFICATE OF CORRECTION

| | | |
|---|---|---|
| PATENT NO. | : 7,565,436 B2 | Page 1 of 1 |
| APPLICATION NO. | : 10/744000 | |
| DATED | : July 21, 2009 | |
| INVENTOR(S) | : Rabie et al. | |

It is certified that error appears in the above-identified patent and that said Letters Patent is hereby corrected as shown below:

In Column 11, Line 26, in Claim 1, delete "racket" and insert -- packet --, therefor.

In Column 12, Line 12, in Claim 12, delete "racket" and insert -- packet --, therefor.

In Column 12, Line 34, in Claim 16, delete "a the" and insert -- the --, therefor.

In Column 12, Line 50, in Claim 16, delete "racket" and insert -- packet --, therefor.

In Column 14, Line 11, in Claim 28, delete "racket" and insert -- packet --, therefor.

Signed and Sealed this

Twenty-seventh Day of September, 2011

David J. Kappos
*Director of the United States Patent and Trademark Office*